(12) United States Patent
Kamata

(10) Patent No.: US 9,699,289 B1
(45) Date of Patent: Jul. 4, 2017

(54) DYNAMIC VEHICLE AUTOMATION LEVEL AVAILABILITY INDICATION SYSTEM AND METHOD

(71) Applicant: Toyota Motor Engineering & Manufacturing North America, Inc., Erlanger, KY (US)

(72) Inventor: Nobuhide Kamata, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/964,474

(22) Filed: Dec. 9, 2015

(51) Int. Cl.
*H04M 1/725* (2006.01)
*H04B 1/3822* (2015.01)
*G05D 1/00* (2006.01)
*H04L 12/40* (2006.01)

(52) U.S. Cl.
CPC ...... *H04M 1/72527* (2013.01); *G05D 1/0088* (2013.01); *H04B 1/3822* (2013.01); *H04L 2012/40273* (2013.01)

(58) Field of Classification Search
CPC ............. H04M 1/72527; G05D 1/0088; H04B 1/3822; H04L 2012/40273
USPC ........................................................ 455/557
See application file for complete search history.

(56) References Cited

U.S. PATENT DOCUMENTS

| | | | | |
|---|---|---|---|---|
| 3,578,117 A * | 5/1971 | Ahlen | ..................... | F16H 47/06 192/3.51 |
| 4,682,225 A * | 7/1987 | Graham | ................... | H04N 7/12 348/E7.045 |
| 4,896,370 A * | 1/1990 | Kasparian | ................ | H04B 1/38 345/168 |
| 5,498,050 A * | 3/1996 | Maruyama | .............. | B60R 5/044 296/37.16 |
| 5,839,083 A * | 11/1998 | Sugiyama | ............ | B60K 28/165 477/115 |
| 5,925,080 A * | 7/1999 | Shimbara | ............. | G05D 1/0244 180/168 |
| 6,015,020 A * | 1/2000 | Sugiyama | ............ | B60K 28/165 180/197 |
| 6,814,687 B2 * | 11/2004 | Jager | ..................... | B60W 10/02 477/77 |
| 8,634,796 B2 * | 1/2014 | Johnson | .................. | H04W 4/02 455/404.1 |
| 8,917,169 B2 * | 12/2014 | Schofield | ............... | B60N 2/002 340/425.5 |
| 9,141,109 B1 * | 9/2015 | Kamata | ................ | G05D 1/0061 |
| 9,238,467 B1 * | 1/2016 | Hoye | .................... | B60W 50/14 |
| 9,335,178 B2 * | 5/2016 | Nickolaou | ............. | G01C 21/34 |
| 9,400,500 B2 * | 7/2016 | Delp | ........................ | B67D 7/04 |
| 9,428,183 B2 * | 8/2016 | Foley | .................... | B60W 30/00 |

(Continued)

Primary Examiner — Hai V Nguyen
(74) Attorney, Agent, or Firm — Christopher G. Darrow; Darrow Mustafa PC

(57) ABSTRACT

A computing device configured for communication with at least one autonomously controllable vehicle system or component. The computing device includes one or more processors for controlling operation of the computing device, and a memory for storing data and program instructions usable by the one or more processors. The one or more processors are configured to execute instructions stored in the memory to transmit a message configured to inform a vehicle user of all currently available levels of vehicle automation.

19 Claims, 6 Drawing Sheets

(56) References Cited

U.S. PATENT DOCUMENTS

| | | | |
|---|---|---|---|
| 9,573,601 B2* | 2/2017 | Hoye | B60W 50/14 |
| 2004/0014564 A1* | 1/2004 | Jager | B60W 10/02 |
| | | | 477/115 |
| 2009/0313095 A1* | 12/2009 | Hurpin | E04H 6/14 |
| | | | 705/13 |
| 2010/0005875 A1* | 1/2010 | Pickl | G01M 15/044 |
| | | | 73/116.02 |
| 2010/0069035 A1* | 3/2010 | Johnson | H04W 4/02 |
| | | | 455/404.1 |
| 2010/0114445 A1* | 5/2010 | Groult | B60T 7/22 |
| | | | 701/70 |
| 2010/0131642 A1* | 5/2010 | Chalikouras | G06Q 30/0241 |
| | | | 709/224 |
| 2010/0277326 A1* | 11/2010 | Berk | G06F 11/3013 |
| | | | 340/636.11 |
| 2011/0118939 A1 | 5/2011 | Kawamata et al. | |
| 2011/0118966 A1* | 5/2011 | Finnis | G08G 1/0962 |
| | | | 701/117 |
| 2011/0298638 A1* | 12/2011 | Groeneweg | G08G 1/096775 |
| | | | 340/905 |
| 2012/0309344 A1* | 12/2012 | Ferrazzini | H04M 1/72519 |
| | | | 455/406 |
| 2014/0218530 A1* | 8/2014 | Sinclair | G08G 1/00 |
| | | | 348/148 |
| 2015/0006014 A1 | 1/2015 | Wimmer et al. | |
| 2015/0211870 A1* | 7/2015 | Nickolaou | G01C 21/34 |
| | | | 701/28 |
| 2015/0242944 A1* | 8/2015 | Willard | G06Q 30/0645 |
| | | | 705/5 |
| 2015/0253772 A1 | 9/2015 | Solyom et al. | |
| 2015/0293216 A1* | 10/2015 | O'Dea | B60W 30/12 |
| | | | 701/23 |
| 2015/0316386 A1* | 11/2015 | Delp | G01C 21/3658 |
| | | | 701/532 |
| 2015/0329111 A1* | 11/2015 | Prokhorov | B60W 10/18 |
| | | | 701/41 |
| 2015/0360698 A1* | 12/2015 | Beyene | B60W 40/09 |
| | | | 701/41 |
| 2016/0031441 A1* | 2/2016 | Foley | B60W 30/00 |
| | | | 701/23 |
| 2016/0096531 A1* | 4/2016 | Hoye | B60W 50/14 |
| | | | 701/23 |
| 2016/0288788 A1* | 10/2016 | Nagasaka | B60W 30/143 |
| 2017/0039871 A1* | 2/2017 | Harkness | G09B 9/05 |

* cited by examiner

DYNAMIC VEHICLE AUTOMATION LEVEL AVAILABILITY INDICATION SYSTEM AND METHOD

TECHNICAL FIELD

The present disclosure relates to autonomous control of vehicles, and, more particularly, to a system and method of tracking a current vehicle automation level and available alternative levels, and of enabling selection of one of the available alternative levels.

BACKGROUND

Vehicles may be configured for various levels of autonomous operation. In addition, due to vehicle operational and/or external environmental factors, a given, normally available level of vehicle automation may not be available over the entire length of a particular ride. From the driver's perspective, it is desirable to know both the level of automation at which the automated vehicle is currently operating and all available alternative levels of automation. To promote safe vehicle control and increased ride quality, it is also desirable to be able to quickly and easily select an alternative level of automation from a list of available levels.

SUMMARY OF THE INVENTION

In one aspect of the embodiments described herein, a computing device is provided. The computing device is configured for communication with at least one autonomously controllable vehicle system or component, and includes one or more processors for controlling operation of the computing device, and a memory for storing data and program instructions usable by the one or more processors. The one or more processors are configured to execute instructions stored in the memory to transmit a message configured to inform a vehicle user of all currently available levels of vehicle automation.

In another aspect of the embodiments described herein, a computing device is provided. The computing device is configured for communication with at least one autonomously controllable vehicle system or component, and includes one or more processors for controlling operation of the computing device, and a memory for storing data and program instructions usable by the one or more processors. The one or more processors are configured to execute instructions stored in the memory to transmit a message configured to inform a vehicle user of a level of automation at which the vehicle is currently operating.

In another aspect of the embodiments described herein, a computing device is provided. The computing device is configured for communication with at least one autonomously controllable vehicle system or component, and includes one or more processors for controlling operation of the computing device, and a memory for storing data and program instructions usable by the one or more processors. The one or more processors are configured to execute instructions stored in the memory to transmit a primary driver control message; and, simultaneous with or after transmission of the primary system driver control message, transmit a message configured to inform the driver of any change in a level of automation at which the vehicle is currently operating.

BRIEF DESCRIPTION OF THE DRAWINGS

The accompanying drawings, which are incorporated in and constitute a part of this specification, illustrate embodiments described herein and together with the description serve to explain principles of embodiments described herein.

DETAILED DESCRIPTION

The embodiments described herein relate to a control system in an autonomous vehicle. The system is configured to continuously monitor and inform a driver of the level of automation at which the vehicle is currently operating. The system is also configured to inform the driver of all levels of automation currently available to the vehicle. The system is also configured to enable the driver to select, from the available levels of automation, a level of automation at which to operate the vehicle. The selected level of automation may be different from the level at which the vehicle currently operates. The system is also configured to notify the driver of any changes to the current automation level at which the vehicle is operating, and of any changes to the automation levels available to the vehicle.

As will be appreciated by one skilled in the pertinent the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media for executing the functions described herein. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
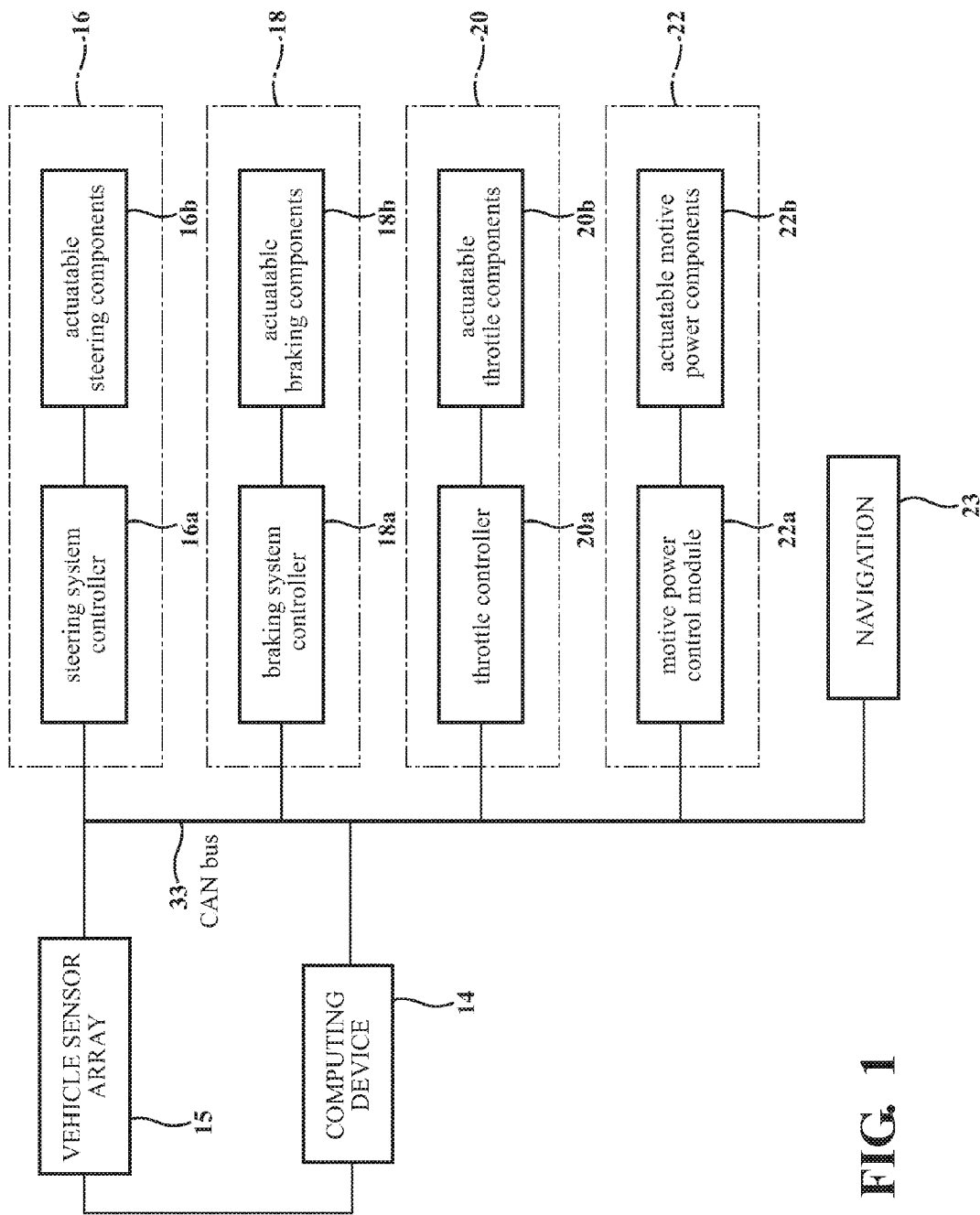
FIG. 1 is a schematic block diagram of a vehicle control system 12 designed to track current and alternative available vehicle automation levels, and to enable selection of alternative automation levels.

FIG. 1 is shows a schematic arrangement of a portion of a vehicle control system 12 configured for at least partial automated control of the vehicle. The control system 12 includes a computing device 14 and a sensor array 15 in operative communication with the computing device. A plurality of control sub-systems 16, 18, 20, 22, 23 is in operative communication with the sensor array 15 and computing device 14. Each of systems 16, 18, 20, 22, 23 is configured for autonomous operation. For example, the embodiment shown in FIG. 1 includes four primary control systems (an automated steering control system 16, an automated braking control system 18, an automated throttle control system 20, an automated motive power control system 22), and a non-primary system (automated navigation system 23). A "primary control system" or "primary system" is a system designed to effect control and operation of one of the primary vehicle controls (i.e., brake, steering, throttle, and motive power), as defined above.

Each automated sub-system may include a specialized controller which is in operative communication with associated actuatable elements operable responsive to control commands received from the controller. For example, braking control system 18 effects automated control of vehicle braking and includes a braking system controller 18a and various actuatable elements (brakes, etc.) 18b necessary for executing braking control commands, and configured to be operable responsive to control commands received from the braking controller. Steering system 16 includes a steering system controller 16a in operative communication with associated actuatable steering components 16b necessary for executing steering control commands. Throttle system 20 includes a throttle controller 20a in operative communication with associated actuatable throttle components 20b necessary for executing throttle control commands. Motive power system 22 includes a motive power system controller 22a in operative communication with associated actuatable motive power components 22b necessary for executing motive power control commands.

The control system 12 may be configured so that the various controllers, sensors and other elements of the system can communicate with each other using a controller area network (CAN) bus 33 or the like. Via the CAN bus and/or other wired or wireless mechanisms, the computing device 14 may transmit messages to various devices in the vehicle and/or receive messages from the various devices, e.g., controllers, actuators, sensors, etc.

The various computing devices may operate in a networked environment supporting connections to one or more remote computers, such as terminals/devices 141 and 151. Computing device 14 and any other computing devices and related terminals/devices 141 and 151, may include devices installed in vehicles, mobile devices that may travel within vehicles, or devices outside of vehicles that are configured to receive and process vehicle and driving data. Thus, the computing device 14 and terminals/devices 141 and 151 may each include personal computers (e.g., laptop, desktop, or tablet computers), servers (e.g., web servers, database servers), vehicle-based devices (e.g., on-board vehicle computers, short-range vehicle communication systems, telematics devices), or mobile communication devices (e.g., mobile phones, portable computing devices, suitably-configured wearable devices (such as a watchband) and the like), and may include some or all of the elements described above with respect to the computing device 14. In addition, any of these computing device embodiments may include a haptic interface or may be configured to provide haptic feedback to a vehicle occupant to inform the occupant of a change in automation status, an active or pending alert, or any other automation status or condition which should be communicated to the occupant. The network connections depicted in FIG. 2 include a local area network (LAN) 125 and a wide area network (WAN) 129, and a wireless telecommunications network 133, but may also include other networks. When used in a LAN networking environment, the driving analysis computing device 14 may be connected to the LAN 125 through a network interface or adapter 123. When used in a WAN networking environment, the device 14 may include a modem 127 or other means for establishing communications over the WAN 129, such as network 131 (e.g., the Internet). When used in a wireless telecommunications network 133, the device 14 may include one or more transceivers, digital signal processors, and additional circuitry and software for communicating with wireless computing devices 141 (e.g., mobile phones, short-range vehicle communication systems, vehicle telematics devices) via one or more network devices 135 (e.g., base transceiver stations) in the wireless network 133. These configurations provide various ways of enabling data, occupant ride quality feedback, and other information to be elicited, received, processed, and displayed exterior of the vehicle.

It will be appreciated that the network connections shown are illustrative and other means of establishing a communications link between the various computing devices may be used. The existence of any of various network protocols such as TCP/IP, Ethernet, FTP, HTTP and the like, and of various wireless communication technologies such as GSM, CDMA, WiFi, and WiMAX, is presumed, and the various computing devices and driving analysis system components described herein may be configured to communicate using any of these network protocols or technologies.

Figure 2:
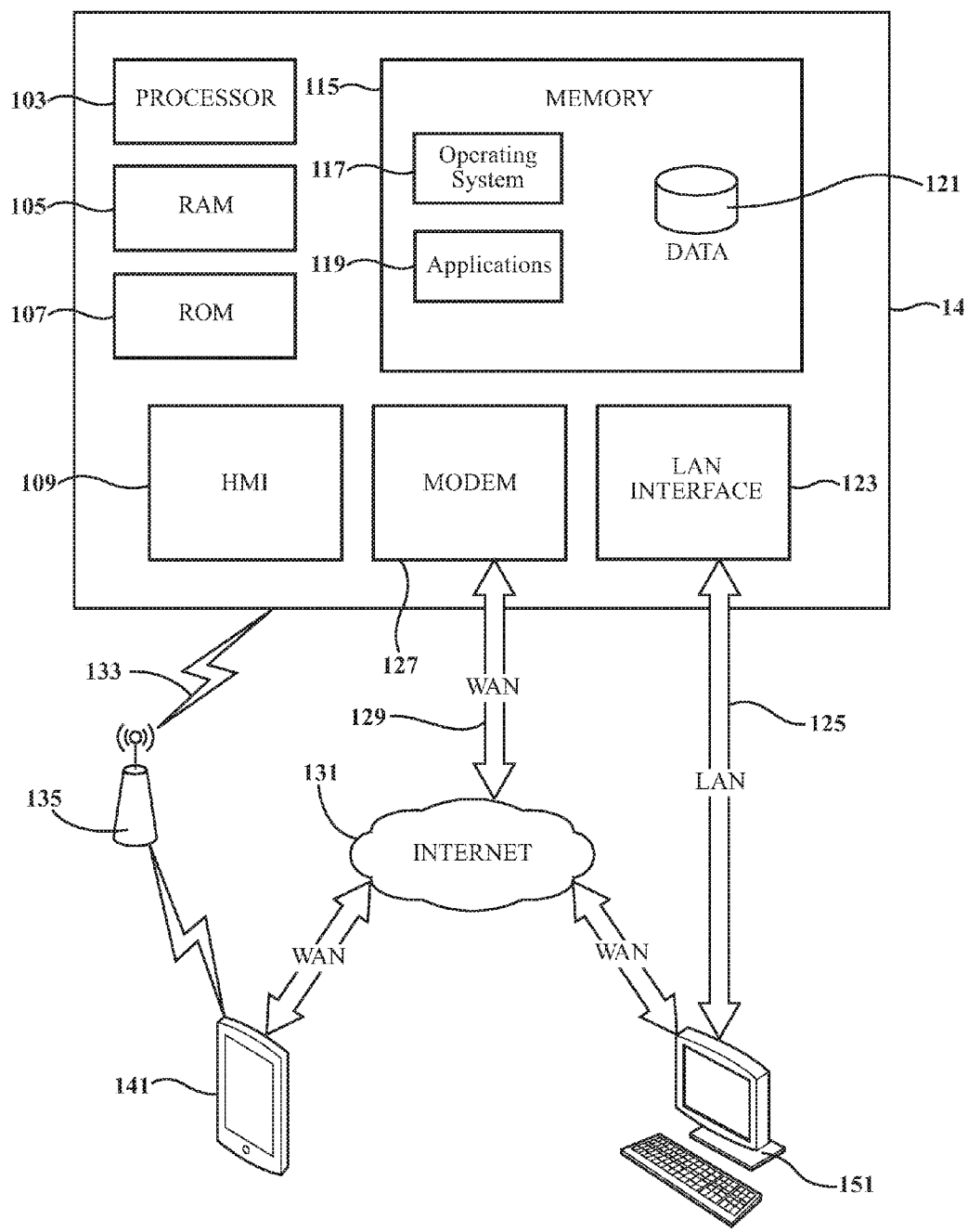
FIG. 2 is a diagram illustrating various components and devices of a computing device, according to one or more aspects of the disclosure.

FIG. 2 illustrates a block diagram of a computing device 14 in the vehicle control system 12 that may be used according to one or more illustrative embodiments of the disclosure. The computing device 14 may have a processor 103 for controlling overall operation of the device 14 and its associated components, including RAM 105, ROM 107, an input/output module or human-machine interface (HMI) 109, and computer-readable storage or memory 115. The computing device 14, along with one or more additional devices (e.g., specialized controllers 16, 18, 20, 22, 23, terminals 141, 151) may correspond to any of multiple systems or devices configured as described herein for functions such as autonomously (i.e., without vehicle operator or occupant input) operating the entire vehicle or specific portions of the vehicle. Computing device 14 may be embodied in a vehicle controller, for example.

Computing device 14 may be configured to serve as an autonomous driving module, coordinating operations of the specialized controllers 16, 18, 20, 22, 23 and controlling (or assisting in coordinated control of) all autonomous driving operations, including steering, braking, etc. Computing device 14 may also be configured to continuously calculate or otherwise determine the currently available levels of vehicle automation based on the capabilities of the various vehicle system controllers, sensors, actuatable control components, and any other pertinent vehicle systems and/or components. Thus, the computing device 14 is configured to track the current vehicle automation level and also all automation levels at which the vehicle may currently be operated. Computing device 14 may also be configured to continuously communicate to a driver the level of automation in which the vehicle currently resides. Computing device 14 may also be configured to continuously communicate to a driver all currently available levels of vehicle automation. Computing device 14 may also be configured to receive driver selection of an available automation level and to operate responsive to the driver selection so as to achieve the selected automation level. Computing device 14 may also be configured to receive and store information from the sensor array 15, from any of specialized control modules 16, 18, 20, 22, 23 and from any other vehicle components pertaining to operation of the automated vehicle control systems. The computing device 14 may also be configured to receive and store the information so all of the information is time-correlated and may be processed for diagnostic purposes.

"Continuous monitoring" and "continuous determination" of the current automation level and the availability of all automation levels are understood to mean that the computing device 14 is configured to receive any information relating to the status of these parameters as soon as possible, for example, as soon as the information exists or is detected. For example, a failure of a sensor used for automated vehicle control may become known when a test signal transmitted through the sensor produces a negative result, or when the automated system employing the sensor attempts to use the sensor for vehicle control. As soon as the computing device 14 receives information relating to the status of the current automation level and/or the availability of any automation level, the computing device acts in accordance with stored programming instructions.

A computer-readable storage or memory 115 includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Input/Output (I/O) module or HMI 109 may include a microphone, keypad, touch screen, and/or stylus through which a user of the computing device 14 may provide input, and may also include one or more of a speaker for providing audio output and a video display device for providing textual, audiovisual and/or graphical output. Software may be stored within memory 115 and/or storage to provide instructions to processor 103 for enabling device 14 to perform various functions. For example, memory 115 may store software used by the device 14, such as an operating system 117, application programs 119, and an associated internal database 121. Processor 103 and its associated components may allow the computing device 14 to execute a series of computer-readable instructions to receive occupant feedback and to perform other interface-related functions as described herein. The interface 109 may incorporate and implement a voice recognition routine, allowing the control system to present automation level information and selection options through a speaker, and to receive driver input through a microphone.

Control system 12 includes an array 15 of vehicle sensors designed to monitor various vehicle operational parameters and environmental conditions external to the vehicle. In a known manner, the vehicle sensors provide data used by the various controllers in formulating and executing suitable control commands in the autonomous vehicle systems 16, 18, 20, 22, 23. For example, data from inertial sensors, wheel speed sensors, road condition sensors, and steering angle sensors may be processed in formulating and executing a command in steering system 16 to turn the vehicle.

The sensor array 15 includes various types of sensors in communication with other control system components, for providing feedback on operations of the vehicle. For example, sensors 15 may detect and store data corresponding to the vehicle's location (e.g., GPS coordinates), speed and direction, rates of acceleration or braking, and specific instances of sudden acceleration, braking, and swerving. Sensors 15 also may detect and store data received from the vehicle's internal systems, relating to such factors as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, maintenance performed on the vehicle, and other data collected by the vehicle's various computing devices.

Additional ones of sensors 15 may detect and store information relating to external driving conditions, for example, external temperature, rain, snow, light levels, and sun position for driver visibility. For example, external cameras and proximity sensors 15 may detect other nearby vehicles, traffic levels, road conditions, traffic obstructions, animals, cyclists, pedestrians, and other conditions that may factor into a driving event data analysis. Sensors 15 also may detect and store data relating to moving violations and the observance of traffic signals and signs by the vehicle. Additional ones of sensors 15 may detect and store data relating to the maintenance of the vehicle, such as the engine status, oil level, engine coolant temperature, odometer reading, the level of fuel in the fuel tank, engine revolutions per minute (RPMs), and/or tire pressure.

Vehicle sensors 15 also may include cameras and/or proximity sensors capable of recording additional conditions inside or outside of the vehicle. For example, internal cameras may detect conditions such as the number of the passengers and the types of passengers (e.g. adults, children, teenagers, pets, etc.) in the vehicles, and potential sources of driver distraction within the vehicle (e.g., pets, phone usage, unsecured objects in the vehicle). Sensors 15 also may be configured to collect data a driver's movements or the condition of a driver. For example, vehicle may include sensors that monitor a driver's movements, such as the driver's eye position and/or head position, etc. Additional ones of sensors 15 may collect data regarding the physical or mental state of the driver, such as fatigue or intoxication. The condition of the driver may be determined through the movements of the driver or through other sensors, for example, sensors that detect the content of alcohol in the air or blood alcohol content of the driver, such as a breathalyzer.

Certain of vehicle sensors 15 also may collect information regarding the driver's route choice, whether the driver follows a given route, and to classify the type of trip (e.g. commute, errand, new route, etc.). In certain embodiments, sensors and/or cameras may determine when and how often the vehicle stays in a single lane or stray into other lanes. A Global Positioning System (GPS), locational sensors positioned inside the vehicle, and/or locational sensors or devices external to the vehicle may be used determine the route, lane position, and other vehicle position/location data.

The data collected by vehicle sensors 15 may be stored and/or analyzed within the vehicle and/or may be transmitted to one or more external devices. For example, the sensor data may be transmitted via telematics devices to one or more remote computing devices, such as a mobile device or laptop computer. Any data collected by vehicle sensors 15 may also be transmitted to any vehicle system or component requiring or utilizing the data for the purposes described herein. For example, the data collected by vehicle sensors 15 may be transmitted to vehicle controller 14, to one or more specialized component controllers, or to the HMI 109.

Particular vehicle sensors may be incorporated into one of the specialized vehicle controllers 16a, 18a, 20a, 22a, 23a. Particular vehicle sensors may also configured to provide inputs to more than one vehicle control system. For example, in a vehicle incorporating both automated steering and braking control, various road condition sensors may provide data to both the steering system controller and the braking controller to enable these controllers to process the road condition information in accordance with stored processor-executable instructions, and to formulate appropriate control commands to the steering system and braking system. In addition, the various specialized controllers 16a, 18a, 20a, 22a, 23a in the vehicle may operate effectively as sensors or as data collectors to provide data or inputs via the CAN bus 33 enabling communication between the elements of the control system.

FIG. 1 shows just a few examples of automated vehicle sub-systems 16, 18, 20, 22, 23 which may be incorporated into a vehicle. A particular vehicle may incorporate one or more of these systems or other systems (not shown) in addition to one or more of the systems shown If a controller requires an integrated or composite signal formed from outputs of multiple individual sensors, a known sensor fusion means (incorporating, for example, a suitable Kalman filter) may be introduced between the sensor array (or the pertinent sensor(s)) and the pertinent controller or incorporated into the controller. Also, if a sensor output signal requires pre-processing prior to use by a controller, a known pre-processing means (for example, an A/D converter) may be introduced between the sensor array (or the pertinent sensor(s)) and the pertinent controller or incorporated into the controller. Similarly, if operation of any actuatable sub-system components will require processing of a control signal received from a controller, a known processing means (for example, an A/D converter) may be introduced between the controller and the actuatable components or incorporated into the controller.

In the embodiments described herein, the vehicle control system 12 is configured to continuously determine and inform the driver of the current vehicle automation level and of all automation levels at which the vehicle may currently operate. In a particular embodiment, the vehicle automation levels used herein are calculated or determined in accordance with the definitions set forth in the NHTSA publication entitled "National Highway Traffic Safety Administration Preliminary Statement of Policy Concerning Automated Vehicles", the text of which is available at http://www.nhtsa.gov/staticfiles/rulemaking/pdf/Automated_Vehicles_Policy.pdf.

The "Definitions—Levels of Vehicle Automation" as set forth in this publication are incorporated herein by reference and are also repeated below:

Level 0—No-Automation. The driver is in complete and sole control of the primary vehicle controls (brake, steering, throttle, and motive power) at all times, and is solely responsible for monitoring the roadway and for safe operation of all vehicle controls. Vehicles that have certain driver support/convenience systems but do not have control authority over steering, braking, or throttle would still be considered "level 0" vehicles. Examples include systems that provide only warnings (e.g., forward collision warning, lane departure warning, blind spot monitoring) as well as systems providing automated secondary controls such as wipers, headlights, turn signals, hazard lights, etc. Although a vehicle with V2V warning technology alone would be at this level, that technology could significantly augment, and could be necessary to fully implement, many of the technologies described below, and is capable of providing warnings in several scenarios where sensors and cameras cannot (e.g., vehicles approaching each other at intersections).

Level 1—Function-Specific Automation: Automation at this level involves one or more specific control functions; if multiple functions are automated, they operate independently from each other. The driver has overall control, and is solely responsible for safe operation, but can choose to cede limited authority over a primary control (as in adaptive cruise control), the vehicle can automatically assume limited authority over a primary control (as in electronic stability control), or the automated system can provide added control to aid the driver in certain normal driving or crash-imminent situations (e.g., dynamic brake support in emergencies). The vehicle may have multiple capabilities combining individual driver support and crash avoidance technologies, but does not replace driver vigilance and does not assume driving responsibility from the driver. The vehicle's automated system may assist or augment the driver in operating one of the primary controls—either steering or braking/throttle controls (but not both). As a result, there is no combination of vehicle control systems working in unison that enables the driver to be disengaged from physically operating the vehicle by having his or her hands off the steering wheel AND feet off the pedals at the same time. Examples of function-specific automation systems include: cruise control, automatic braking, and lane keeping.

Level 2-Combined Function Automation: This level involves automation of at least two primary control functions designed to work in unison to relieve the driver of control of those functions. Vehicles at this level of automation can utilize shared authority when the driver cedes active primary control in certain limited driving situations. The driver is still responsible for monitoring the roadway and safe operation and is expected to be available for control at all times and on short notice. The system can relinquish control with no advance warning and the driver must be ready to control the vehicle safely. An example of combined functions enabling a Level 2 system is adaptive cruise control in combination with lane centering. The major distinction between level 1 and level 2 is that, at level 2 in the specific operating conditions for which the system is designed, an automated operating mode is enabled such that the driver is disengaged from physically operating the vehicle by having his or her hands off the steering wheel AND foot off pedal at the same time.

Level 3—Limited Self-Driving Automation: Vehicles at this level of automation enable the driver to cede full control of all safety-critical functions under certain traffic or environmental conditions and in those conditions to rely heavily on the vehicle to monitor for changes in those conditions requiring transition back to driver control. The driver is expected to be available for occasional control, but with sufficiently comfortable transition time. The vehicle is designed to ensure safe operation during the automated driving mode. An example would be an automated or self-driving car that can determine when the system is no longer able to support automation, such as from an oncoming construction area, and then signals to the driver to reengage in the driving task, providing the driver with an appropriate amount of transition time to safely regain manual control. The major distinction between level 2 and level 3 is that at level 3, the vehicle is designed so that the driver is not expected to constantly monitor the roadway while driving.

Level 4—Full Self-Driving Automation (Level 4): The vehicle is designed to perform all safety-critical driving functions and monitor roadway conditions for an entire trip. Such a design anticipates that the driver will provide destination or navigation input, but is not expected to be available for control at any time during the trip. This includes both occupied and unoccupied vehicles. By design, safe operation rests solely on the automated vehicle system.

Thus, in a particular embodiment, the automation levels communicated to a driver in the vehicle control system embodiments described herein will correlate with the automation levels defined above.

The computing device 14 may employ any suitable method for continuously monitoring and/or determining the available automation levels. In one embodiment, the nominally available automation levels are determined based on the capabilities of the various vehicle system controllers, sensors, actuatable control components, and any other pertinent vehicle systems and/or components. Then, the effects of various occurrences on the availability of the automation levels may be calculated. For example, the availability of one of vehicle automation levels 1-4 may be affected by such factors as loss of sensors, controller malfunction, the occurrence of vehicle or external environmental conditions outside those under which the automated system is designed to operate, and other factors. The effects of these occurrences on any given vehicle control system may be calculated, given its maximum or highest level of automation and the known operational relationships between the controllers, sensors and other elements of the control system.

For example, a vehicle may be able to operate at any of automation levels "0"-"2" when all systems and components are functioning properly. At level "2", in accordance with the definition of level "2" automation, the automated systems controlling at least two primary control functions work in unison to relieve the driver of control of those functions. For example, automated throttle control and automated steering may operate in cooperation to provide, respectively, adaptive cruise control and lane centering. However, if a sensor malfunction impairs automated control of steering, the driver would need to assume steering control, and the automated steering system would not be able to operate in cooperation with automated throttle control as previously described. Thus, the available automation levels may be reduced to "0" and "1".

The effects on available automation levels of sensor malfunction, and the effects of other sensor and component malfunctions (and various combinations of malfunctions) may be determined for a given system prior to operation of the vehicle. Also, the effects of the loss of particular automated systems due to the occurrence of operating conditions outside of designed specifications may be determined for a given system prior to operation of the vehicle. All of these effects may be stored in a memory (for example, in the form of look-up tables) for use by the computing device 14 during vehicle operation. Using this stored information, when the computing device 14 detects that a vehicle component or system becomes unavailable, the computing device may determine the effect on automation level availability and/or the remaining available automation levels. The computing device 14 may then message the driver as described herein and take any other appropriate control actions based on the changes in automation level availability. If desired, diagnostic or test signals may be periodically transmitted through the various controllers, sensors, and other components in a known manner to determine if the components are functioning properly. This aids in detecting a component or system malfunction as early as possible.

The vehicle control system 12 is also configured to enable a driver to select one of the currently available automation levels, to receive a driver selection of a currently available automation level, and to operate responsive to the driver selection such that the vehicle is operated at the selected automation level.

Figure 4:
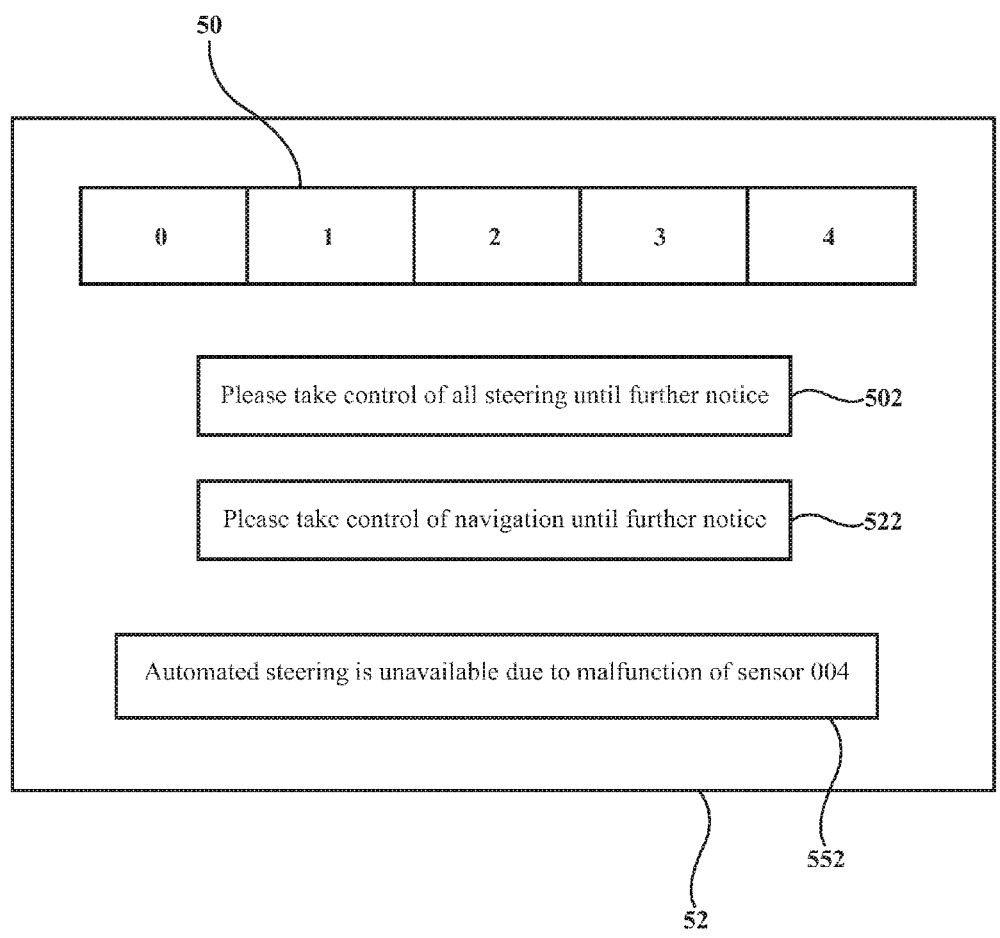
FIG. 4 is a schematic view of a screen shot of one embodiment of an interactive screen appearing on a visual interface or display used for transmitting messages to the vehicle driver.

FIG. 4 shows one embodiment of an automation level status menu 50 presented in a touch-screen display 52 of HMI 109. The menu 50 is a graphical representation of all possible levels of vehicle automation, as set forth in the above-mentioned NHTSA definitions. In one embodiment, the current level of vehicle automation is illuminated in a specific color (for example, green). All other available levels of automation are illuminated in a different color (for example, yellow). Unavailable levels of vehicle automation are not illuminated.

The menu 50 is also interactive. By touching an illuminated level of automation other than the current level, a driver may select that level of automation. The vehicle control system will then implement the selected automation level. For example, if the current vehicle automation level is "1" but the HMI display shows that level "2" is available, the driver may select level "2" by touching the appropriate portion of menu 50. The driver may select either a lower level or a higher level of automation than the current level, as long as the chosen level of automation is currently available.

A level of automation may also be selected by voice command. For example, the vehicle control system may recite to the driver the current level of automation and a list of the available alternative levels, followed by a query as to the driver's automation level preference. The driver can then select an automation level by voice command using a microphone in communication with (or incorporated into) the HMI. For example, the driver may say "select level 2". The control system would then implement level 2 (assuming that this level is available). Alternatively, the driver could say "select level 2" without first receiving a prompt or a list of available automation levels via the HMI.

If the selected level of automation is not available, the control system may transmit an error message to the driver, followed by a recitation of the currently available automation levels.

Changes in the current automation level and/or to the list of currently available automation levels may also be conveyed to the driver using the HMI. The information displayed on the screen 52 is updated on a continuous basis. In addition, the HMI 109 transmits a voice alert to the driver as soon as possible after any status changes, updating the driver on the automation level at which the vehicle is currently operating and the list of all currently available automation levels.

Figure 5A:
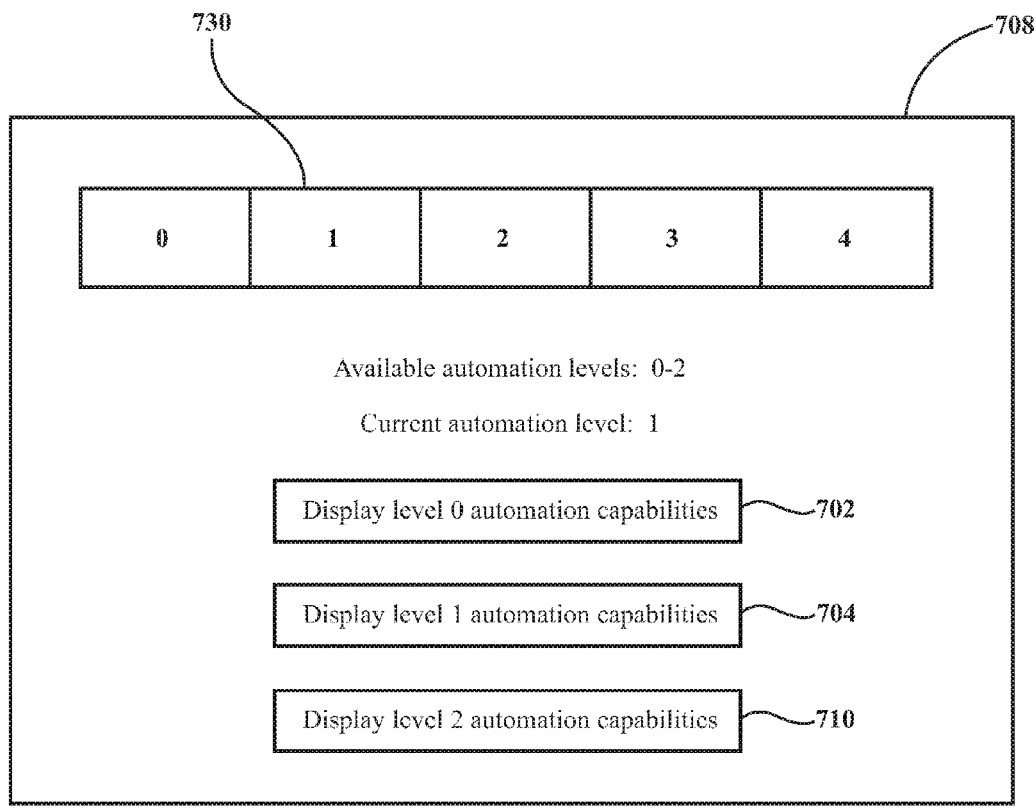
FIG. 5A is a schematic view of a screen shot of an alternative embodiment of an interactive screen appearing on a visual interface or display used for transmitting messages to the vehicle driver.
Figure 5B:
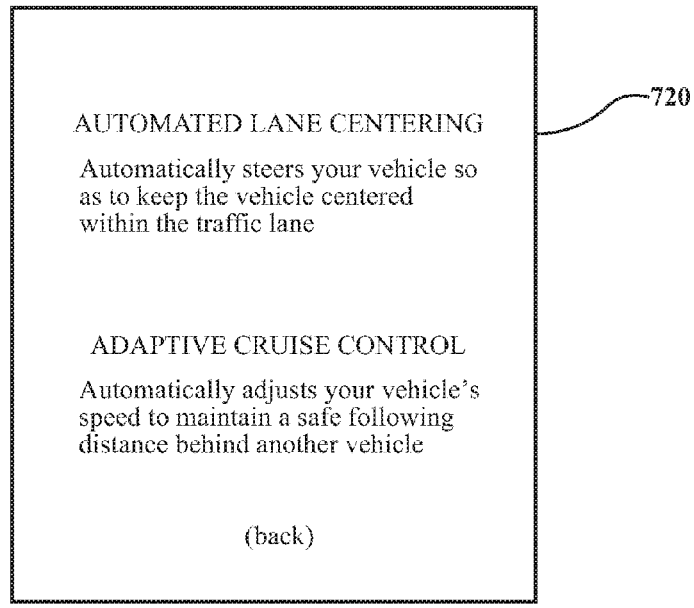
FIG. 5B is a schematic view of a screen shot of another alternative embodiment of an interactive screen appearing on a visual interface or display used for transmitting messages to the vehicle driver.

An alternative display mode is shown in FIGS. 5A-5B. In the screen 708 shown in FIG. 5A, the system may display an automation selection bar or menu 730 as previously described, enabling the occupant to select an available level of automation. The screen 708 also indicates all available levels of automation and the current level of automation. In addition, the system may be configured to indicate or recite (for example, visually through display 708 and also via audio) a list of the vehicle automated systems and/or the associated automated capabilities relating to a selected level of automation.

For example, display portions 702, 704 and 710 may be interactive and may be activated, for example, by touching the screen. If on the display 708 of FIG. 5A the available levels of vehicle automation are 0-2 and the current automation level is indicated to be "1", prior to the vehicle occupant choosing to operate the vehicle at level "2", the occupant may select (via voice command and/or touch screen) an option 710 to "display level 2 automation capabilities". Execution of this command brings up the display screen 720 shown in FIG. 5B, which illustrates for the occupant the vehicle capabilities associated with the level of automation chosen from the previous screen (in this case, level "2"). This screen 720 of FIG. 5B may show a textual description of the vehicle capabilities. The visual display may also be accompanied by an audio recitation of the vehicle capabilities at the selected level of automation.

In one example, level 2 automation includes automated lane centering capability and adaptive cruise control. The display of FIG. 5B may list each of these capabilities along with the operations that may be performed by the associated capability. For example, the display states that the "automated lane centering" capability "Automatically steers your vehicle so as to keep the vehicle centered within the traffic lane". Also, the display states that the "adaptive cruise control" capability "Automatically adjusts your vehicle's speed to maintain a safe following distance behind another vehicle". Additional information may also be provided further explaining the capabilities, limitations and/or operating requirements of the selected level of automation. A "back" option gives the user the ability to return to the previous screen.

The system may be configured to execute a similar display sequence for any selected and/or available level of automation. That is, any selected and/or available level of automation may be detailed and defined for the vehicle occupant in terms of the vehicle systems and capabilities associated with the level of automation. This helps clarify for the occupants the scope of the definition of each level of automation.

Similarly, if systems and/or capabilities are impaired or lost so as to lead to a reduction in available automation levels, the automation availability indication system and displays and/or messaging systems may be configured to accommodate the change in vehicle capabilities and to display the revised capabilities to the occupants in real time, as soon as the change in vehicle capabilities occurs.

In additional alternative embodiments, the various levels of vehicle automation used for vehicle operation and as presented to the vehicle occupants as described above may not be defined according to the NHTSA levels previously described, but rather may be otherwise defined and/or classified by the vehicle or system manufacturer according to capabilities of a particular system or vehicle. The type of display mode shown in FIGS. 5A and 5B can be utilized for any automation levels defined using any of a variety of criteria.

Figure 6:
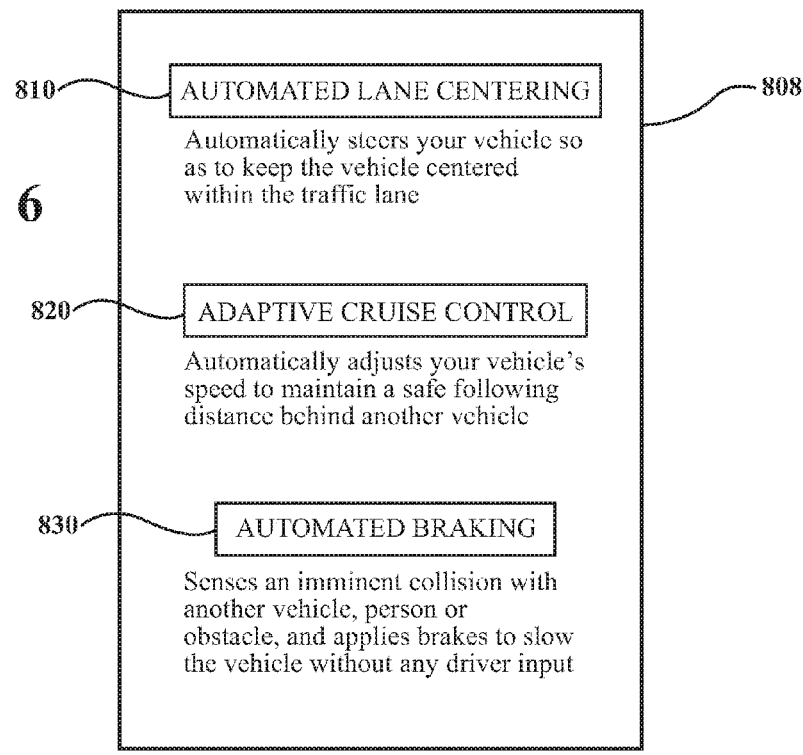
FIG. 6 is a schematic view of a screen shot of another alternative embodiment of an interactive screen appearing on a visual interface or display used for transmitting messages to the vehicle driver.

Another alternative display mode is shown in FIG. 6A. In the interactive screen 808 shown in FIG. 6A, the system displays all available automation levels in terms of the vehicle automated systems and/or the associated automated capabilities relating to those levels. Thus, in this aspect, the available levels of automation are conveyed to the user indirectly.

For example, if the highest available automation level is level 2, and the automated systems relating to all levels 0-2 are automated lane centering, automated braking, and adaptive cruise control, these systems may be displayed on screen 808 along with their associated automated capabilities. The visual display may also be accompanied by an audio recitation of the vehicle capabilities at the selected level of automation. A user may then touch the screen 808 at one or more of locations 810, 820 and 830 to activate the associated automated systems and capabilities. If one or more of the systems becomes unavailable or if a second system cannot operate in conjunction with a first, selected system for a particular reason, the second system may be darkened on the display 808 to show that it is not available for selection. This enables automated vehicle systems and combinations of systems to be selected directly by the user, in terms of their capabilities and availability.

The visual and voice interfaces described herein may be embodied in any one of a variety of computing devices including a processor and a memory, as well as communication capabilities. For example, the interfaces may operate on a portable computer, tablet computer, a smart phone, etc. that includes capabilities for wireless communications using IEEE 802.11, Bluetooth, and/or cellular communications protocols. Further, the device implementing the interface may use such communication capabilities to communicate with a vehicle computing device 14. A device could communicate with a vehicle computer 14 via other mechanisms such as a network in the vehicle, a known protocol such as Bluetooth, etc. Accordingly, the user device may be used to carry out certain operations herein ascribed to a data collector 110, e.g., voice recognition functions, cameras, global positioning system (GPS) functions, etc., and the user device could be used to provide data to the computing device 14, and may be used to provide a human machine interface (HMI) to the computing device 14.

Thus, the visual and voice interfaces described herein may be embodied in one or more application programs in a cellular phone, PDA, or other wireless device, for example. These embodiments of the interfaces may enable communication with the vehicle control system without the need installation of a touch screen or audio equipment in the vehicle interior. In another embodiment, the wireless device may communicate with the vehicle control system via a suitable docking station or port residing in the vehicle interior.

A vehicle may have a nominal available level of automation based on the capabilities of the various automated control systems under ideal operating conditions. However, for numerous reasons (involving, for example, the state of the vehicle, road conditions and/or external environmental conditions, and other factors), the nominal automation level may become unavailable during a ride. Automated control capabilities may be lost for a portion of a trip or for the remainder of a trip, for example, due to system or component malfunction. Automated control capabilities may also be lost due to an inability to operate under current or impending external environmental conditions or vehicle conditions (i.e., conditions under which the automated control system is not intended to operate).

Thus, consequent to informing the driver of the current vehicle automation level and all automation levels at which the vehicle may currently operate, the vehicle control system embodiments described herein are configured to alert the driver as soon as possible to any changes in the current automation level and to any changes in the available automation levels, especially where these changes involve possible transfer of vehicle control to the driver.

In the system embodiments described herein, as soon as one of the automated control capabilities necessary for operation of the vehicle at a given level of automation is lost, the HMI display is controlled so as to decrement the indicated current available automation level, and is also modified as necessary to ensure display of all currently available alternative automation levels.

Thus, for example, a vehicle may have an adaptive cruise control capability and a lane centering capability. The vehicle control system may be configured so that these capabilities operate in cooperation with each other to enable the vehicle to automatically maintain an appropriate speed and following distance while remaining centered within a road lane. Thus, the vehicle would have a nominal automation level of "2". If one of these capabilities becomes impaired (for example, due to a sensor failure) or unusable (for example, due to adverse road conditions), these capabilities would no longer be able to operate in cooperation with each other to automatically maintain vehicle speed and spacing with lane centering. However, the remaining automated system (either adaptive cruise control or lane centering) would still be able to assist or augment the driver in operating either throttle or steering, respectively. Thus, in this case, the current vehicle automation level displayed on the HMI would be decremented or reduced to "1". If the impaired capability again becomes operational, the automation level status menu 50 displayed on the HMI would be modified to show that level "2" is now available to the driver, by illuminating section "2" of the menu. If both the adaptive cruise control and lane centering capabilities become lost, the current vehicle automation level displayed on the HMI would be decremented or reduced to "0" by "darkening" or de-illuminating of sections "1" and "2" of the menu. If at least one of the impaired capabilities again becomes operational, section '1' of the menu can then be illuminated to show that level "1" is now available to the driver.

In addition, the driver may at any time select a lower level of automation using the display or voice command. Also, the driver may at any time and in a known manner assume and exercise manual control over an otherwise autonomously operating vehicle system. For example, the driver may assume manual control of steering by gripping and operating the steering wheel. In another example, the driver may assume manual throttle control by operating the accelerator pedal. Where manual operation of the vehicle system results in a lower current level of vehicle automation, the vehicle system would respond by updating the displayed current automation level.

In some vehicles (for example, vehicles having a nominal automation level of "2" or above), there may be two or more combinations of control systems that act in cooperation with each other to relieve the driver of particular control functions. Thus, these vehicles would technically meet the requirements of automation level "2" as described above if all of the control systems in either of these combinations are functioning properly. However, if one control system in a first combination becomes impaired while all of the control systems in the second combination remain functioning, the vehicle would still meet the requirements for level "2" automation. In this case, in one embodiment of the vehicle control system, the control system would still indicate level "2" automation as being available. Also, if the current vehicle automation level was "2" when the system loss occurred, the current automation level would not be decremented on the HMI display. However, a driver control message as described herein may be transmitted to the driver, detailing the specific actions the driver is to take and/or the specific primary vehicle controls the driver is to be responsible for until notified otherwise, as a result of the unavailability of the automated system. This option enables the vehicle to remain operating at the highest currently-available automation level even if a particular control system is currently unusable at that level.

The control system is also configured to provide a driver control message to the driver via the HMI, clarifying what primary vehicle controls are the current responsibility of the driver.

Figure 3:
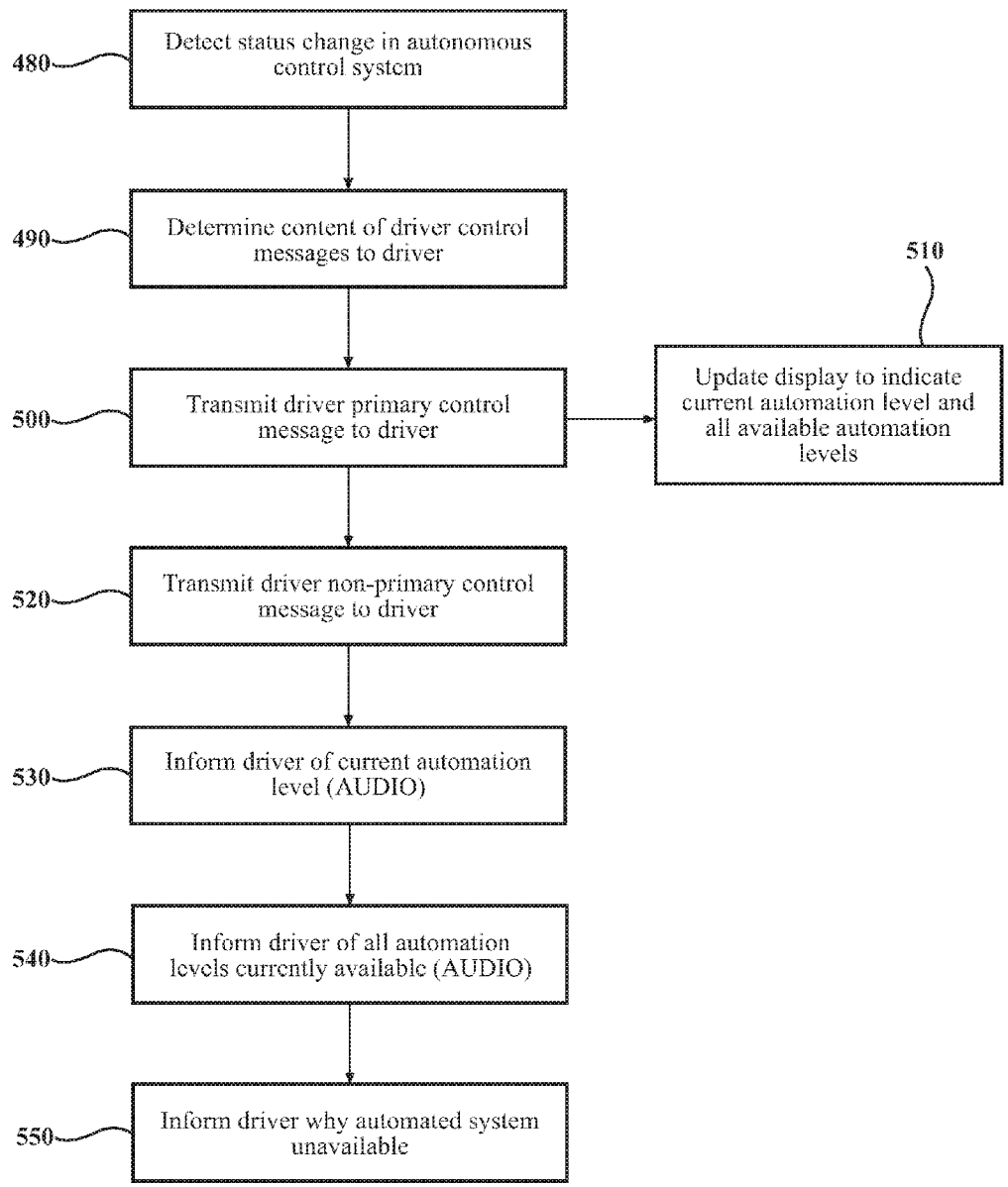
FIG. 3 is a flow diagram illustrating transmission of various messages to the driver of a vehicle.

If there is a change in the vehicle control system affecting the current automation level and/or a change in the availability of any automation levels, it is desirable for a driver control message to be delivered to the driver as soon as possible, especially where these changes involve possible transfer of vehicle control to the driver. Referring to FIG. 3, blocks 480-550 show one exemplary control sequence including detection of a status change in an autonomous vehicle control system involving possible transfer of vehicle control to the driver, and transmission of driver control. The purpose of the driver control message is to alert the driver, as soon as possible, of any specific actions she must take in order to ensure safe operation of the vehicle. The driver control message may be in a visual form appearing on a display and may also be in audio form, transmitted through vehicle internal speakers. The driver control message may be preceded by and/or accompanied by an alarm designed to attract the driver's attention and to inform the driver that an important message is pending. The driver control message may indicate the specific actions the driver is to take and/or any specific vehicle controls the driver is to be responsible for until notified otherwise. For example, the message may state "Please take control of all steering until further notice", or "Please take control of all navigation until further notice".

In block 480, the vehicle control system detects a change in the system affecting the current automation level and/or a change in the availability of any automation levels.

In block 490, responsive to a detected change in the system affecting the current automation level and/or a change in the availability of any automation levels, the vehicle control system determines the content of any driver control messages to be transmitted to the driver. The message content (for example, any driving tasks that the driver will need to perform in view of the change in automation status) will be determined by the nature and extent of the status change.

In block 500, a primary system driver control message 502 is transmitted to the driver via screen 52 and also via audio. The primary system driver control message may indicate the specific actions the driver is to take and/or any specific primary vehicle controls the driver is to be responsible for until notified otherwise. For example, the message may state "Please take control of all steering until further notice", or "Please take control of all braking until further notice".

In block 510, simultaneous with or after transmission of the primary system driver control message, the control system decrements or otherwise updates the current automation level shown on the display, and also updates the display so that all remaining available automation levels are shown. This enables, as rapidly as possible, selection of an alternative automation level by the driver. For example, the unavailability of an automated system may diminish the automated control capability of the vehicle control system such that the highest available automation level is reduced from "2" to "1". In this case, the menu may be modified so as to de-illuminate section "2" and to continue to illuminate only sections "0" and "1".

After information relating to driver control of primary systems has been transmitted, the control system may transmit a non-primary system driver control message 522 (using visual and audio transmission means, as previously described) describing the specific actions the driver is to take and/or any specific non-primary vehicle controls the driver is to be responsible for until notified otherwise. For example, at this point, the control system may transmit any messages relating to failure or impairment of the vehicle navigation system.

In block 530, the driver is informed (via audio) of the current vehicle automation level. Informing the driver of important information via audio obviates the need for the driver to look at the screen display while driving.

In block 530, the driver is informed (via audio) of all automation levels currently available.

In block 550, a message 552 may be transmitted to the driver (via audio and video) as to which automated control system(s) are malfunctioning or otherwise unavailable and, if possible, why the system(s) are unavailable.

In one embodiment, the automation level status menu 50 remains displayed and is operational by the driver for the entire period when the vehicle engine is running. This enables the driver to change the automation level of the vehicle at any time during the ride. In addition, the automation levels displayed are always updated as rapidly as possible, so that the driver is informed to the greatest degree possible regarding the current available automation levels of the vehicle.

The system embodiments described herein are also configured so that, at any time, the driver can assume operational control of the primary systems by simply selecting the "0" automation level option via the HMI, using the touch screen and/or voice command, for example. The control system embodiments described herein are also provide a method for the driver to quickly assume full control of all primary control systems, for example, by pushing a button located within the driver's reach or by touching a portion of a touch screen display. In particular embodiments, the vehicle control system may be configured to give priority to driver input regarding primary systems. For example, the control system may be configured to permit the driver to assume control of a primary system by using the brakes, the accelerator pedal, or the steering wheel.

Computing device 14 may also be configured to receive and store information from the sensor array 15, from any of specialized control modules 16, 18, 20, 22, 23 and from any other vehicle components pertaining to operation of the automated vehicle control systems. The computing device 14 may also be configured to receive and store the information so all of the information is time-correlated and may be processed for diagnostic purposes. This may aid in determining the reason why one or more became unavailable.

In one embodiment, a vehicle control system as described herein is configured for installation in a vehicle by the vehicle manufacturer during fabrication. Referring again to FIG. 1, in a particular embodiment, the computing device 14 may be configured for retrofitting into an existing vehicle structured to operate in more than one of the levels of automation described herein. The retrofit computing device (and any desired driver communication interface, such as a touch-screen, audio communication system, docking station, etc.) may be installed in the vehicle, in communication with the vehicle sensors and any suitable controllers and vehicle components so as to enable operation of the driver interface in the manner described herein.

It should be understood that the preceding is merely a detailed description of various embodiments of this invention and that numerous changes to the disclosed embodiments can be made in accordance with the disclosure herein without departing from the spirit or scope of the invention. Thus, the disclosure is not to be limited to these embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A computing device configured for communication with at least one autonomously controllable vehicle system or component, the computing device comprising one or more processors for controlling operation of the computing device, and a memory for storing data and program instructions usable by the one or more processors, wherein the one or more processors are configured to execute instructions stored in the memory to transmit a message configured to inform a vehicle user of all currently available levels of vehicle automation.

2. The computing device of claim 1 wherein the one or more processors are configured to execute instructions stored in the memory to continuously monitor availability of all levels of vehicle automation.

3. The computing device of claim 1 wherein the one or more processors are configured to execute instructions stored in the memory to enable user selection of a level of vehicle automation from the currently available levels of vehicle automation.

4. The computing device of claim 1 wherein the one or more processors are configured to execute instructions stored in the memory to, responsive to a change in a vehicle affecting a current automation level and/or a change in an availability of any automation levels, generate a message configured to inform a vehicle occupant of any vehicle automated control system(s) which are malfunctioning or unavailable.

5. The computing device of claim 1 wherein the one or more processors are configured to execute instructions stored in the memory to transmit a message configured to inform a vehicle user of any change in the currently available levels of vehicle automation.

6. The computing device of claim 4 wherein the one or more processors are configured to execute instructions stored in the memory to, responsive to the change in the vehicle affecting the current automation level and/or the change in the availability of any automation levels, generate a message configured to inform a vehicle occupant regarding why any vehicle automated control system(s) which are malfunctioning or unavailable, are malfunctioning or unavailable.

7. A vehicle including a computing device in accordance with claim 1.

8. A computing device configured for communication with at least one autonomously controllable vehicle system or component, the computing device comprising one or more processors for controlling operation of the computing device, and a memory for storing data and program instructions usable by the one or more processors, wherein the one or more processors are configured to execute instructions stored in the memory to continuously determine all currently available levels of vehicle automation based on the capabilities of the vehicle systems and/or components.

9. The computing device of claim 8 wherein the one or more processors are configured to execute instructions stored in the memory to continuously communicate all currently available levels of vehicle automation.

10. The computing device of claim 8 wherein the one or more processors are configured to execute instructions stored in the memory to enable a user to select an available level of vehicle automation different from the level of automation at which the vehicle is currently operating.

11. The computing device of claim 8 wherein the one or more processors are configured to execute instructions stored in the memory to transmit a message configured to inform a vehicle user of any change in the automation level in which the vehicle is currently operating.

12. A vehicle control system including a computing device in accordance with claim 8.

13. A vehicle including a computing device in accordance with claim 8.

14. A computing device configured for communication with at least one autonomously controllable vehicle system or component, the computing device comprising one or more processors for controlling operation of the computing device, and a memory for storing data and program instructions usable by the one or more processors, wherein the one or more processors are configured to execute instructions stored in the memory to:
  transmit a primary driver control message; and
  simultaneous with or after transmission of the primary system driver control message, generate a message configured to inform a vehicle occupant of all currently available automation levels.

15. The computing device of claim 14 wherein the one or more processors are configured to execute instructions stored in the memory to, simultaneous with or after transmission of the primary system driver control message, update a display so that all remaining available automation levels are shown on the display.

16. The computing device of claim 14 wherein the one or more processors are configured to execute instructions stored in the memory to, after transmission of the primary system driver control message, transmit a non-primary system driver control message.

17. The computing device of claim 14 wherein the one or more processors are configured to execute instructions stored in the memory to generate a message configured to inform a vehicle occupant of any vehicle automated control system(s) which are malfunctioning or otherwise unavailable.

18. A vehicle including a computing device in accordance with claim 14.

19. The computing device of claim 1 wherein the one or more processors are configured to execute instructions stored in the memory to transmit a message configured to communicate all vehicle automated capabilities relating to a selected level of vehicle automation.

* * * * *